United States Patent [19]

Shroff

[11] E Re. 30,448

[45] Reissued Dec. 16, 1980

[54] TAPE RECORDER SYSTEM

[75] Inventor: Bansi K. Shroff, Englewood, Colo.

[73] Assignee: Honeywell Inc., Minneapolis, Minn.

[21] Appl. No.: 3,621

[22] Filed: Jan. 15, 1979

Related U.S. Patent Documents

Reissue of:

[64] Patent No.: 4,095,758
Issued: Jun. 20, 1978
Appl. No.: 635,941
Filed: Nov. 28, 1975

[51] Int. Cl.[3] ..... G11B 15/32; G11B 15/46; G11B 15/60; G11B 23/10

[52] U.S. Cl. ..... 242/192; 242/203

[58] Field of Search ..... 242/192, 197, 198, 199, 242/200, 189, 201, 190, 202, 203, 204, 206-210, 75.51, 75.5, 75.1, 76; 318/6, 7

[56] References Cited

U.S. PATENT DOCUMENTS

| | | | |
|---|---|---|---|
| 2,457,699 | 12/1948 | Marsen | 242/192 |
| 2,804,508 | 8/1957 | Mastling et al. | 242/192 |
| 3,161,361 | 12/1964 | Iida | 242/192 |
| 3,235,194 | 2/1966 | Willis | 242/192 |
| 3,252,668 | 5/1966 | Miller et al. | 242/192 |
| 3,370,803 | 2/1968 | Newell | 242/192 |
| 3,460,781 | 8/1969 | Uber | 242/192 |
| 3,526,371 | 9/1970 | Blackie et al. | 242/192 |
| 3,528,625 | 9/1970 | Bumb, Jr. | 242/192 |
| 3,528,626 | 9/1970 | Bumb, Jr. | 242/192 |
| 3,638,880 | 2/1972 | Hollingsworth | 242/192 |
| 3,851,840 | 12/1974 | Bastiaans | 242/198 |
| 3,861,573 | 1/1975 | Kawasaki et al. | 318/7 |
| 3,863,117 | 1/1975 | Paschetto | 242/75.51 X |
| 3,941,333 | 2/1976 | Carpenter et al. | 242/197 |
| 3,945,036 | 3/1976 | Karsh | 242/182 |

OTHER PUBLICATIONS

Pear, Jr., C. B., Magnetic Recording in Science and Industry, Reinhold Publ. Co., (1967), pp. 179-185, 188-203, 226-235, 238-251, 262-265.

Lowman, C. E., Magnetic Recording, McGraw-Hill Book Co., (1972), pp. 92-107, 128-141, 222-233.

Jorgensen, F., Handbook of Magnetic Recording, Tab Books, (1970), pp. 9-11, 26-31, 36-53.

Orlando, A. et al., Dual-Capstan Tape Transport, IBM Technical Disclosure Bulletin, vol. 14, No. 7, Dec. 1971.

*Primary Examiner*—George F. Mautz
*Attorney, Agent, or Firm*—Laurence J. Marhoefer

[57] ABSTRACT

A high performance magnetic tape transport and tape cartridge. The cartridge includes coplanar hubs carrying tape rolls on fixed axes, a brake system which urges each hub in a direction to tension the tape when the cartridge is removed from the transport, and a pair of doors which completely enclose the front face of the cartridge when the cartridge is out of the transport and automatically open to expose the entire front face of the cartridge when it is inserted in the transport. The transport includes a pair of capstans, each mounted on its own carriage assembly with its own drive motor. The capstans have a high friction surface. The carriage assemblies are spring biased with equal force toward the front of the cartridge. When the cartridge is inserted in the transport, the capstans drivingly engage the peripheries of the tape rolls, and magnetic transducer heads in the transport engage the front face of a span of tape between the rolls. The capstan motors are driven by a servo control system which automatically maintains constant tape speed and constant tape tension. Special provisions are made for making the tape/head interface precisely reproducible for different transports and different cartridges.

19 Claims, 10 Drawing Figures

TAPE RECORDER SYSTEM

Matter enclosed in heavy brackets [ ] appears in the original patent but forms no part of this reissue specification; matter printed in italics indicates the additions made by reissue.

BACKGROUND OF THE INVENTION

This invention relates to high performance magnetic tape recorder systems and in particular to a high performance tape transport and cartridge.

High performance magnetic tape recorders have been devised for recording and reproducing various types of signals, such as audio signals, analog instrumentation signals and digital data signals. All such recorders must position the tape accurately with respect to a transducer head, must accurately control tape speed, and must maintain uniform tape tension. In many applications they must also be capable of very high acceleration and deceleration rates and very high tape speeds. In some, the capability of recording and reproducing signals in both directions of tape movement is important. The relative importance of these virtues differs from application to application, so that a recorder designed for digital data acquisition, where search speed and data packing densities may be of greatest interest, represents a different design compromise from an instrumentation recorder designed for precise speed control and low flutter at each of several selectable speeds.

Presently known high performance tape recorder systems are complex and expensive. A standard tape transport includes a pair of reels, on which a tape is wound, and a transducer (record or reproduce head) between the reels. A motor-driven capstan pulls the tape across the transducer at a uniform speed. The reels are mounted on tensioning motors which drive the reels in opposition thereby establishing tension in the tape and winding the tape in a roll on the take-up reel. Because the amount of tension generated in the tape by the reel motors and capstan is dependent on the constantly changing size of the tape roll on each reel, methods have been devised to sense the tension in the span of tape extending across the transducer and to control the reel motors accordingly. One method uses a tension arm to sense changes in tension; more recent methods use a vacuum column into which a loop of tape is drawn by a constant vacuum. Both of these systems require long spans of tape between reels, require complex circuitry, and inherently involve changes of tension before corrections are made. Nonetheless, they have been widely used in high performance tape drives.

Another system, based on the conventional approach, adds a second capstan on the other side of the transducer heads from the first capstan. Running the capstan on the take-up side faster than the capstan on the supply side provides a tension across the transducer heads which is substantially independent of the tensioning provided by the reel motors. The capstans are driven by individual motors connected electronically to each other and to a timing signal through a servo system. This system requires four motors and complex circuitry to coordinate the speeds of all the motors.

Another approach which has been tried is based on the techniques described in Newell, U.S. Pat. No. 3,370,803 (1968), and Uber, U.S. Pat. No. 3,460,781 (1969). These systems utilize a peripheral drive in which coplanar takeup and supply rolls of tape are mounted on precision carriages and are biased into contact with a central drive capstan. The capstan has a resilient surface in driving engagement with both the periphery of the supply roll and the periphery of the takeup rolls, at the point of departure of tape from the supply roll and at the point of tape arrival at the takeup roll. Tape tension is generated by biasing the takeup roll into contact with the capstan with greater force than applied to the supply roll, thereby causing a differential deformation in the resilient surface of the motor-driven capstan, hence a difference in peripheral speeds of the supply and takeup rolls. A peripheral drive system has the practical advantage that the capstan squeegees out air which otherwise becomes trapped between layers of tape in the takeup roll, and it therefore produces hard-packed tape rolls. The tension generated in the tape, however, is highly dependent on the uniformity of the elastomeric properties of the capstan. It is also dependent on the precise geometry of the capstan-tape roll interface. Therefore, in practical systems the tension generated is dependent on such variables as inhomogeneities in the elastomer, the size of the tape rolls and the temperature, and the tension is not uniform.

It has long been recognized as desirable to provide a high performance tape system in which the tape rolls are enclosed in a cartridge. Cartridge systems not only eliminate threading the tape from one reel to the other, but provide considerable environmental protection for the tape when it is out of the transport. They also permit the tape to be removed from the system without rewinding the tape.

Attempts made heretofore to produce a truly high performance tape recorder system utilizing tape cartridges have not been completely successful. Systems based on conventional tape transports generally require such long spans of tape between reels that tape must be pulled from the cartridge (either manually or by a complex mechanism) to provide proper tape speed and tension control, and to provide proper guidance of the tape span by high precision guides. The openings required in the cartridge for reel drive shafts, capstans, tape pulling devices and the like make complete dust-proofing of the cartridge almost impossible. Most importantly, the performance of these cartridge systems has not generally been as good as the performance of high performance open reel recorders.

Attempts have been made to overcome these shortcomings by basing cartridge systems on something other than a conventional tape transport. Most of these systems, however, have resulted in complex and expensive cartridges. For example, numerous cartridges having coaxial reels have been built and proposed. Tape tension is generated either by dragging the supply reel and driving the takeup reel, or by coupling the two reels by a spring mechanism and driving the tape with a capstan. Neither tensioning scheme is entirely effective, and both increase the complexity and cost of the cartridge. Moreover, accurate and gentle guiding of the tape is difficult or impossible.

Although the peripheral drive systems of the Newell and Uber patents, supra, are not particularly well adapted to the use of cartridges, attempts have also been made to utilize them in a cartridge drive system. Such an attempt is shown in Blackie et al, U.S. Pat. No. 3,526,371 (1970). The cartridge shown in that patent contains two tape reel carriage assemblies and a fixed capstan or idler roller. One of the chief aims of a cartridge tape recorder system is to make the cartridges as simple as possible; the cartridges of this system are expensive and complicated. Another cartridge-type tape transport, ostensibly based on the same drive concept, is shown in Hollingsworth, U.S. Pat. No. 3,638,880 (FIGS. 6–8). Although the cartridge disclosed in the patent is simple, the system is incapable of high performance. In fact, the system is little more than a conventional system without a capstan. Its tape speed and tape tension therefore vary as the sizes of the tape rolls change.

Still another attempt to produce a high performance cartridge drive system utilizes a cartridge containing tape rolls on fixed axes and an endless band which engages the peripheries of both rolls of tape. The band or the tape is driven by an external capstan. The band is so arranged around support posts that its differential stretch causes the takeup reel to run faster than the supply reel, and thereby tensions the tape. Such a system is shown in Wolff, U.S. Pat. No. 3,861,619 (1975). These systems may utilize a simple transport having a single drive motor and no separate tensioning means. However, the systems have inherent limitations which restrict the degree of performance they can provide. They are subject to objectionable flutter and tension variations caused by non-uniformities in the stretch and frictional characteristics of the tensioning band and by undesired frictional and rotational characteristics of the posts which support the tensioning band. Such systems also require rather complex cartridges, provide limited tensioning forces, are capable of limited acceleration rates and a limited range of speeds, have a limited life, and are of limited adaptability to varied applications.

SUMMARY OF THE INVENTION

One of the objects of this invention is to provide an extremely simple tape recorder transport system which meets or exceeds present standards for high performance recorders, such as standards for tape speed and speed accuracy, acceleration and deceleration rates, low skew, and uniform tensioning.

Another object is to provide such a high performance system utilizing tape cartridges which are simple and reliable, and which are interchangeable without degradation of performance.

Other objects will become apparent in light of the following description and accompanying drawings.

In accordance with one aspect of this invention, generally stated, a tape transport system is provided of a type including a pair of coplanar hubs rotatable about fixed axes and a length of pliable tape carried in rolls on the hubs, a transducer cooperative with a span of tape between the rolls, and drive means for driving the tape across the transducer from one of the tape rolls to the other, wherein the drive means include a pair of movable capstans biased into driving engagement with the peripheries of the rolls, and control means for driving the capstan engaging the tapeup roll faster than the capstan engaging the supply roll. The difference in speed is chosen so as to generate a desired tension in the span of tape intermediate the rolls. Preferably, the capstans are mounted on the rotors of separate drive motors, and each drive motor/capstan assembly is mounted on a separate movable carriage. The capstans are preferably biased into engagement with the tape rolls by a common spring which automatically equalizes the forces exerted by the capstans on the tape rolls, regardless of their positions. The control means are preferably a control circuit which controls the speeds of both motors. The motor driving the tapeup roll capstan carries a tachometer and is driven in accordance with a speed signal; the motor driving the supply roll capstan is controlled in such a manner as to provide constant tape tension. Both motors preferably carry tachometers, to permit identical operation of the transport in either direction of tape movement. Novel tape drive systems having particularly advantageous control circuits are described herein, but are the joint invention of Bansi K. Shroff, the inventor herein, and Stephen K. Shu, and are claimed in copending application Ser. No. 635,940, filed concurrently herewith.

The transport system of the invention handles tape gently, yet very precisely. Because the tape tension is maintained electronically at an optimum, with far less variation in tension than with previously known systems, the configuration of the tape roll is highly reproducible and stable.

The capstan engaging the periphery of the takeup roll squeezes air from beneath the outer wrapping of tape and forms a tight, hard-packed roll. Becuse the tape rolls behave much as if they were solid discs, their acceleration and deceleration rates are limited only by their moments of inertia and the available power which can be applied to them. Therefore, although the system is not capable of the acceleration/deceleration rates of a state-of-the-art vacuum column system, it is limited only by the size and acceleraton/deceleration speeds of its capstan motors.

The tape transport system of the present invention, because it requires no reel motors and no complex tape tension sensing devices, is extremely simple and reliable. It is also particularly well adapted for using tape cartridges without degradation of performance. The cartridges need contain only tape wrapped on hubs rotatable on fixed axes, fixed tape guide means and certain standard auxiliary equipment such as an internal brake to prevent tape from spilling when the cartridge is out of a transport, and file protect means to prevent accidental recording over existing data on the tape. Cartridge systems in accordance with the present invention may provide performance levels that in most respects equal or exceed those of presently known high performance reel-to-reel systems. Tape recorder systems utilizing an improved, simple, cartridge design, which provides a very high degree of tape protection, maintains tape tension even under adverse handling conditions, and positions the tape extremely accurately with respect to a magnetic recording head or transducer, are described herein, but are the joint invention of Bansi K. Shroff, the inventor herein, Frank Dekker and John Nordrehaug, and are claimed in copending application Ser. No. 635,939, filed concurrently herewith.

The improved and simplified transport and cartridge have other novel and advantageous features, which are more easily understood in light of the following description of the preferred embodiments.

Throughout this description and claims, the cartridge and transport are described as being oriented in such a way that the cartridge reels rotate in a horizontal plane about vertical axis. It will be understood that this orientation is used merely for convenience in describing the invention. One of the advantages of the present system is that it may be used in different orientations without affecting its performance.

DESCRIPTION OF THE PREFERRED EMBODIMENT

Figure 1:
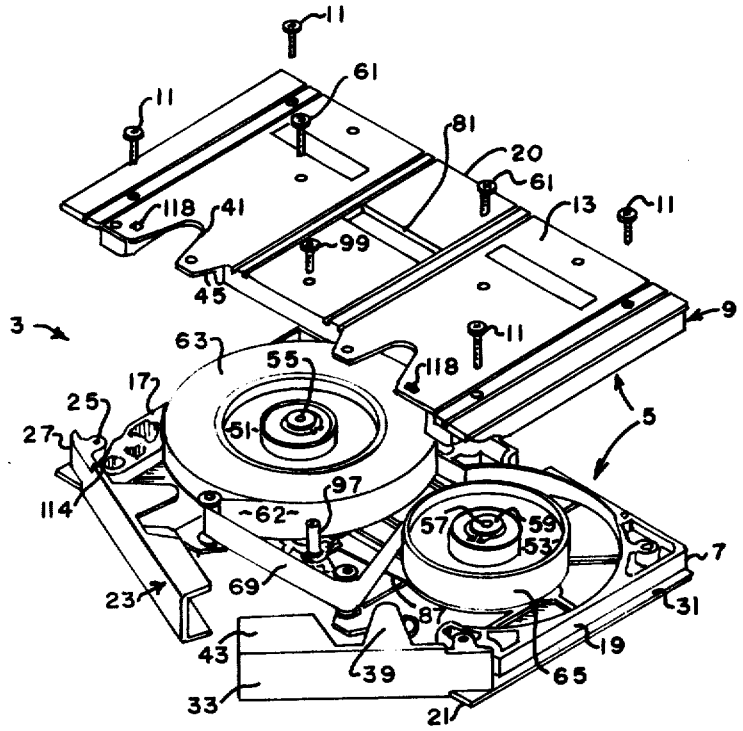
FIG. 1 is an exploded view in perspective of one embodiment of magnetic tape cartridge of this invention, used in the preferred embodiment of tape transport system of this invention.

The organization and operation of the preferred cartridge-type transport system 1 of the present invention are most easily understood in terms of the cooperation of the preferred embodiment of cartridge 3 and the preferred embodiment of tape transport 4. Therefore, first the cartridge 3, then the transport 4, then their cooperation and the operation of the system will be described.

A. Cartridge

The cartridge 3 includes a casing 5 which is conveniently formed as a lower casting 7 and an upper casting 9. The upper and lower castings are generally identical, and the two castings are secured to each other by cap screws 11. The casing has a broad upper wall 13, a broad lower wall 15, a first side 17, a second side 19, a back 20 and a front 21. The five faces of the cartridge other than the front are all substantially sealed from dust and other atmospheric contaminants. The only holes in these faces to the interior of the cartridge are filled by screws or fixed shafts, as will become apparent hereinafter.

Figure 2:
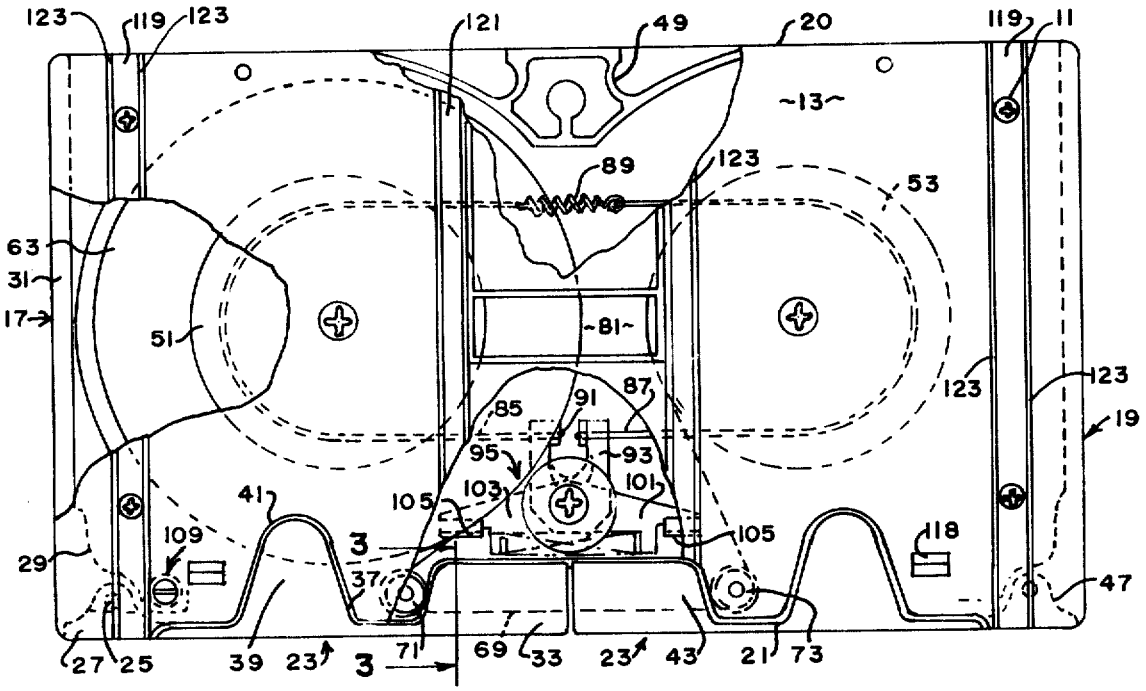
FIG. 2 is a top plan view of the cartridge of FIG. 1, with portions of the top cover broken away.
Figures 3, 4, 5, 7:
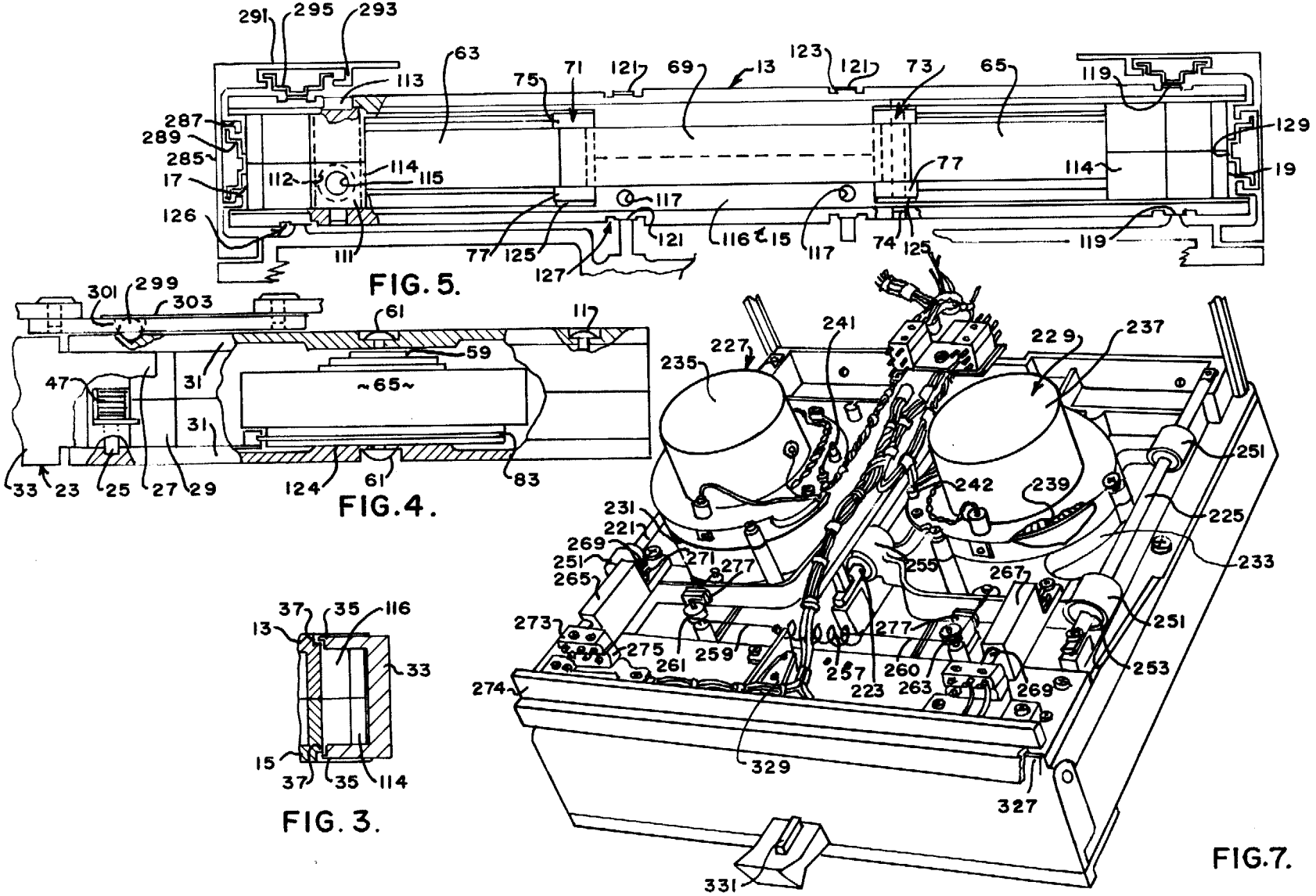
FIG. 3 is a sectional view taken along the line 3—3 of FIG. 2.
FIG. 4 is a view in side elevation, partially broken away, of the cartridge of FIGS. 1-3, showing also portions of the transport which position the cartridge in the transport.
FIG. 5 is a view in front elevation of the cartridge of FIGS. 1-4, with a pair of doors removed, and also showing further parts of the transport used for positioning the cartridge in the transport.
FIG. 7 is a view in perspective of the under side of the transport shown in FIG. 6.
Figure 6:
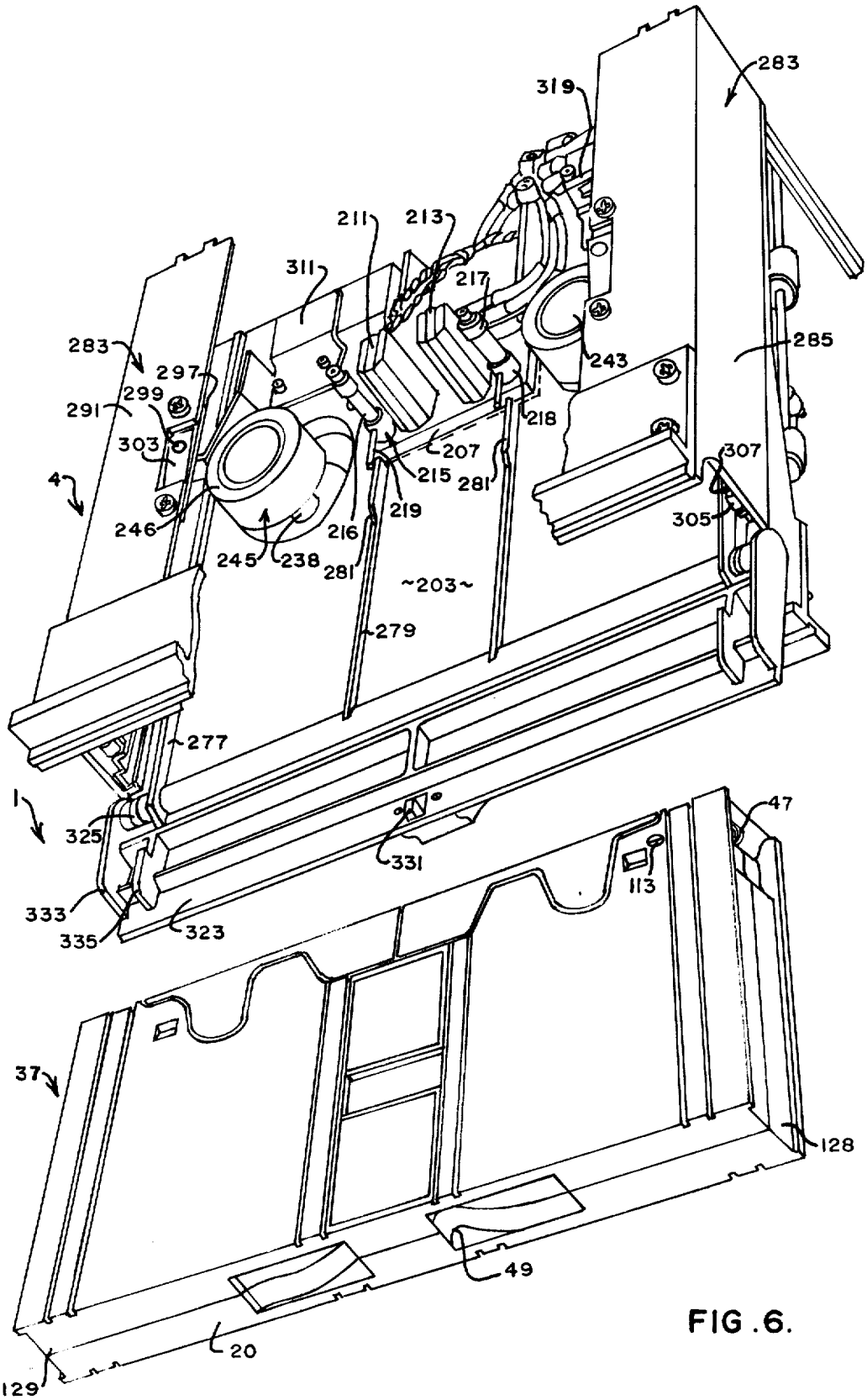
FIG. 6 is a view in perspective of a tape transport system of this invention, with a portion of a mounting plate of the tape transport broken away.

The front of the cartridge is covered by a pair of doors 23 which are mounted on vertical hinge pins 25 at the front corners of the cartridge. Outwardly extending ends 27 on the doors 23, outboard and the hinge pins 25, are accomodated in recesses 29 in the sides of the cartridge when the doors 23 are open. The outboard ends 27 of the doors 23 are cut in slightly at their top and bottom to allow them to move between upper and lower flanges 31 on the sides and front corners of the cartridge. The parts 33 of the doors 23 inboard of the hinge pins 25 are channel-shaped in cross section, as shown in FIG. 3. The upper and lower arms of the door parts 33 include flanges 35 which overlap complementary rabbets 37 in the front edges of the upper wall 13 and lower wall 15 of the casing. The upper and lower arms of the channel-shaped inboard ends 33 of the doors 23 include rearwardly extending ears 39 covering corresponding recesses 41 in the top and bottom of the cartridge and rearwardly extending flaps 43 covering a central recess 45 in the top and bottom walls of the cartridge. The doors are constructed to form a close fit with each other at the center of the cartridge on the order of four hundredths of an inch (one millimeter) apart. Therefore, the doors cover substantially the entire front of the cartridge when they are closed. Springs 47 around the hinge pins 25 bias the doors 23 to the closed position shown in FIG. 2.

The back 20 of the casing is provided with a finger hold 49 for ease of handling the cartridge, particularly for removing the cartridge from a transport as described hereinafter.

The casing 5 and doors 23 are preferably cast of a durable and workable material, such as aluminum. The casing 5 has a width of about 8⅝ inches (21.8 cm), a depth of 5 inches (12.8 cm) and a height of 1⅛ inches (2.8 cm).

Within the casing 5 are two hubs 51 and 53 rotatably mounted on fixed shafts 55 and 57 and held in place by retaining rings 59. The hubs are spaced apart 3⅞ inches (9.8 cm) center-to-center. The shafts 55 and 57 are rigidly secured between the top and bottom walls of the cartridge by cap screws 61. A length of magnetic recording tape 62 is convolutely wound around the hub 51 to form a tape roll 63 and around the second hub 53 to form a tape roll 65. As shown particularly in FIGS. 1 and 2, the roll 63 of this embodiment is enlarged by turning the hub 51 counterclockwise, and the roll 65 on the hub 53 is enlarged by rotating the hub 53 clockwise. The span 69 of tape 62 between the first roll 63 and the second roll 65 is positioned across the front 21 of the cartridge by a pair of rotating tape guides 71 and 73 rotatably mounted on fixed shafts 74 between the upper wall 13 and lower wall 15 of the cartridge casing at opposite sides of their central recess 45. The tape guides 71 and 73 thus define the ends of the span of tape across the front of the cartridge. It will be seen that if the side of the tape facing forward in the span 69 (that is, the oxide side of the tape) is regarded as the front of the tape, the guides 71 and 73 engage the back of the tape, and the back of the tape also faces out as the tape is formed in rolls 63 and 65. The tape, in this embodiment, is ½ inch (1.27 cm) wide, one mil base (0.0254 mm) thick, and six hundred usable feet (183 usable meters) long. The actual thickness of the tape may be on the order of 1.13 mils (0.0287 mm) and the total length of the tape about 650 feet (198 meters). One thousand usable feet (305 meters) of half mil (0.0127 mm) base tape may be substituted if desired. Each hub 51 and 53 is 2½ inches (6.4 cm) in diameter, and the maximum diameter of a tape roll is 4-3/16 inches (10.6 cm) when the roll is formed with a constant tape tension of 6.5 ounces and all interlayer air is squeegeed out by a peripheral roller, as described hereinafter. The tape guides 71 and 73 have a vertical dimension, between upper and lower guide flanges 75 and 77, which is on the order of 0.006 inch (0.15 mm) greater than the nominal width of the tape. This height provides good positioning of the tape but permits minute corrections in its position to be made at the transport, as described hereinafter.

Clear plastic windows 81 in the upper and lower walls of the cartridge permit visual inspection of the amount of tape in each tape roll.

Each of the hubs 51 and 53 includes, below the cylindrical surface on which the tape 62 is wound, an annular groove 83. A first band 85 extends around the first hub 51 in its groove 83, and a second band 87 extends around the second hub 53 in its groove 83. The bands 85 and 87 may be glass-core, braided nylon, having a diameter of 0.036 inch (0.9 mm). A first end of the band 85 and a first end of the band 87 are attached to the ends of a helical spring 89 toward the back of the cartridge. The other ends of the bands 85 and 87 are attached to the arms 91 and 93, respectively, of a brake actuator 95. The arms 91 and 93 are pivotally mounted on a shaft 97 held to the upper and lower walls of the cartridge by cap screws 99. Integrally formed with the arms 91 and 93, respectively, are wings 101 and 103, which have vertical engagement parts 105 at their outer ends for engagement by a brake disabling means in the transport. A second helical tension spring 107 is connected between the wings 101 and 103. The effective strength of the spring 107 is only slightly less than if it were connected in-line with the bands 85 and 87. The spring 107 is considerably heavier than the first helical spring 89. By way of example, the spring 89 may exert a force of about 5 ounces (140 gms), and the spring 107 may exert a linear force of about 24 ounches (672 gms). Thus, when the cartridge is out of a tape transport, the spring 107 pulls the arms 91 and 93 close together and extends the spring 89 against its bias. In this position, the bands 85 and 87 form an effective brake around the hubs 51 and 53. It has been found that even when the cartridge is vibrated vigorously, the differential brake described prevents slippage of the rolls 63 and 65 or loosening of the tape span 69. In fact, vibration of the cartridge may somewhat tighten the tape span 69. Therefore, the cartridge 3 may safely be handled or shipped without any tape spillage or slackening.

The cartridge 3 also includes, near its front and just outboard of the first hub 51, a file protect device 109. The file protect device is simply a rotatable post 111 with an opening 112 on one side to accomodate a push rod. A head portion 113 of the file protect post 111 extends through the upper wall 13 of the cartridge for manually rotating the post 111. The post 111 is journaled in one of a pair of sleeve parts 114 cast integrally with the cartridge casing 5. A forward-facing hole 115 in the lower casing 7 permits a push rod to enter the sleeve part 114 carrying the file protect post 111 and sense the post's rotational position.

The front of the casing 5 also includes a curved wall 116 behind the tape span 69 to give the front of the casing rigidity. Two openings 117 in the wall part 116 of the lower casing 7 provide access to the engagement part 105 of the brake release wings 101 and 103.

The integral sleeve parts 114 also have flat front faces which provide a reference for positioning the cartridge in a transport. A pair of V-grooves 118 in the cartridge top 13 outboard of the recesses 41 are also useful for aligning the cartridge as described hereinafter.

The manufacturing technique by which the cartridge 3 is assembled assures that the hubs and tape guides are positioned accurately with respect to reference surfaces in the cartridge which are in turn easily and accurately referred to reference surfaces in the transport. This technique makes cartridge 3 interchangeable to an extent not possible with previously known cartridge tape transport systems. The broad top and bottom faces 13 and 15 of the cartridge are provided with two outboard lands 119 and two inboard lands 121, extending from the front to the rear of the cartridge. Each of the lands 119 and 121 is defined by a pair of grooves 123. In the manufacture of the cartridge 3, the inner surface of the lower casting 7 is machined at four places to form four reference surfaces: directly below the hubs 51 and 53 to form reference bearing surfaces 124 (FIG. 4), and directly below the rotatable tape guides 71 and 73 to form reference bearing surfaces 125 (FIG. 5). The lower casting 7 is then turned over and supported on the four reference surfaces 124 and 125, while the lands 119 and 121 on its outer face are milled to a precisely controlled depth relative to the reference surfaces 124 and 125. The lands 119 and 121 therefore become the bottom, reference, surfaces of slots 126 and 127 defined by the outer edges of the grooves 123. This construction technique provides very close tolerance positioning of the hubs 51 and 53 and tape guides 71 and 73, hence of the magnetic tape 62, with respect to the lands 119 and 121 on the lower face 15 of the cartridge 3. Using the V-grooves 118 for reference, holes are drilled for shafts 74 of the tape guides 71 and 73 and the mounting screws 61 of the hubs 51 and 53, and the side surfaces 17 and 19 of the cartridge are milled to form reference surfaces 128 and 129, respectively, perpendicular to the reference surfaces 119 and 121. The reference surfaces 119, 121, 128 and 129 permit precise alignment and positioning of the cartridge in a transport, as described in more detail hereinafter. It will be understood that the cartridge may be made invertible if desired.

B. Transport

Transport 4 includes a cast base plate 203 which carries the other parts of the transport. A central recess in the upper face of the base plate 203 carries a pair of integral mounting pads 204 on which a transducer assembly 205 is mounted. The transducer assembly 205 includes a mounting plate 207 secured to the mounting pads 204 by cap bolts 209, a record head 211, a reproduce head 213 and a pair of fixed tape guides 215. The transducer head assembly 205 may be used for either digital or instrumentation (analog) systems and may easily be replaced with head assemblies having up to five heads simply by removing the bolts 209 and putting in the new assembly, without further alignment. The tape guides 215 have a tape guiding surface 216 between upper and lower flanges 217 and 218, which has a height equal to the nominal width of the magnetic tape 62. This height is very carefully controlled to provide precise positioning of the tape with respect to magnetic heads 211 and 213 without damage to the tape edges. Careful positioning of the heads 211 and 213 and tape guides 215 on the plate 207 also ensures accurate deflection of the tape in a horizontal plane. Therefore, not only skew but head/tape contact is precisely controlled. The axes of the tape guides 215, in the illustrative embodiment, are separated $1\frac{7}{8}$ inches (4.76 mm), as compared with an axial separation of $2\frac{3}{4}$ inches (7 cm) between the cartridge tape guides 71 and 73. Mounted on the lower flanges of the tape guides 215 are brake release pins 219.

Mounted on the under side of the base plate 203 are three parallel horizontal rods 221, 223 and 225 secured at their ends to lugs on the bottom of the plate 203 and extending front to rear of the plate 203. Slidably mounted on the rods are a pair of capstan/motor carriages 227 and 229, including support castings 231 and 233, respectively, and DC motors 235 and 237, respectively.

The motors 235 and 237 are a low inertia type and are rates at one hundred ounce-inches peak torque. The shafts 238 of DC motors 235 and 237 carry tachometer rotors 239, which cooperate with electronic read-out assemblies 241 and 242, respectively. The motors 235 and 237 are connected to a power source 401 through a control circuit 403 as described hereinafter in connection with the operation of the tape transport system.

Also carried on the shafts 238 of the motors 235 and 237, respectively, are capstans 243 and 245. Each capstan has a diameter of 1.5 inches (3.8 cm), including a thin jacket 246 of silicone rubber. The surface 246 of the capstan provides highly slip-resistant driving contact with the periphery of a tape roll, but the surface of the capstan is not appreciably deformed by the tape roll. The capstans 243 and 245 are spaced apart axially 4-11/16 inches (11.9 cm), and extend above the base plate 203 through openings 247 and 249 in the base plate 203. The capstans 243 and 245 are designed to extend into the cartridge casing 5, between the upper wall 13 and lower wall 15. The motor shafts 238 are accomodated by the recesses 41 in the lower wall 15 of the cartridge.

The support castings 231 and 233 have two spaced apart outside feet 251 slidably mounted on rods 221 and 225 by linear ball bearings 253. Each support casting 231 and 233 also includes an offset foot 255 mounted on the central rod 223 by a linear ball bearing 253. The offset foot 255 permits the use of a single central supporting rod and permits the support castings 231 and 233 to be identical with each other.

The two carriages 227 and 229 are biased to a forward position by a helical four-pound tension spring 257, the ends of which are secured by bands 259 and 260 around rotatable guides 261 and 263, respectively, to the carriage support structures 231 and 233. This arrangement ensures that the forward bias on the carriage 227 is identical with the bias on the carriage 229, regardless of the relative positions of the carriages 227 and 229. When a cartridge is inserted in the transport, the amount of extension of the spring 257 is only slightly dependent on the relative diameters of the tape rolls. Because the system is not dependent on a differential force to generate tension, and the surfaces of the capstans are not appreciably deformed, the peripheral speeds of the tape rolls are substantially identical with the peripheral speeds of the capstans regardless of the absolute force on the capstans. Therefore, any slight change in the absolute force exerted by the helical spring 257 will be insignificant.

The carriages 227 and 229 carry dual switch activators 265 and 267, respectively. Each activator 265 and 267 carries a pair of slidable push rods 269 and 271 spring biased to a forward position. As one of the carriage assemblies 227 or 229 moves forward to a predetermined position, its lower actuator rod 269 engages and activates a first switch 273 or 273' mounted to a forward mounting plate 274 on the base plate 203. As the carriage moves a slight distance farther forward, its upper actuator rod 271 engages and actuates a second switch 275 or 275' on the mounting plate 274. The switch 273 functions to warn of the impending end of the tape when the system is in a record mode, and the switch 275 disables the drive from continued movement in the same direction at the "actual" end of the tape. When no cartridge is in the transport, as shown in FIG. 7, the push rods 269 and 271 of both switch assemblies 265 and 267 engage their respective switches 273 and 275 and are pushed back against the bias of their internal springs because the carriage assemblies 227 and 229 are farther forward than their end-to-tape position. The forward movement of the carriage assemblies 227 and 229 is limited by stops 277.

It will be seen that the foregoing parts of the transport 4 are usable as an open reel (non-cartridge) transport system by the simple addition of a pair of hubs, rotatable about fixed axes, although such features as spring loading the switch activators 265 and 267 to provide for over travel may be unnecessary. The remaining parts of the preferred embodiment of transport 4 are designed specifically for use with the cartridge 3, and will therefore be described in terms of their cooperation with the cartridge 3.

C. Cooperation of Cartridge and Transport

The upper face of the base plate 203 includes four parallel ribs extending front to rear of the base plate. The outboard two ribs 277 extend ⅛ inch (3.2 mm) above the plane of the plate 203. The forward portions 279 of the inboard ribs do not extend as high, but rearward parts 281 of the inboard ribs, just forward of the transducer assembly 205, extend to the same height as the outboard ribs 277. The height of the ribs 277 and rib parts 281 is carefully controlled relative to the height of the mounting pads 204 on which the transducer assembly 205 is mounted. The ribs 277 and 281 are spaced apart the same distance as the slots 126 and 127 defined by grooves 123 on the lower face 15 of the cartridge 3, but the ribs are less than half as wide as the slots. When a cartridge 3 is inserted in the transport 4, its vertical position in the transport is determined by the metal-to-metal contact of lands 119 in the cartridge and ribs 277 and 281 in the transport. Therefore, alignment of the tape in the transport tape guides 215, without damage to the tape edges, is ensured. Because the width of the cartridge slots 126 and 127 is greater than the width of the transport ribs, the possibility of binding is reduced or eliminated. The width of the cartridge slots 126 and 127 also allows the cartridge to be positioned laterally by other means, as set out below.

Two transport side extrusions 283 are secured to the sides of the base plate 203 by cap screws. Vertical walls 285 of the side extrusions 283 include channels 287 in which pressure plates 289 are captured. As the cartridge 3 is inserted in the transport 4, the pressure plate 289 engage the reference surfaces 128 and 129 on the sides 17 and 19 of the cartridge and center the cartridge with respect to the transducer head assembly 205. The accuracy of this alignment is less critical than the vertical positioning of the cartridge, but may be controlled quite closely. The leaf-spring action of the pressure plates 289 facilitates inserting and removing the cartridge.

The upper horizontal reaches 291 of the extrusions 283 include channels 293 which carry pressure plates 295 for exerting a downward bias on the lands 119 on the upper face of the cartridge 3. Also mounted to the upper horizontal reaches 291 are plates 297. Alignment balls 299 extend through holes 301 in plates 297 and spring arms 303 bias the balls 299 downward into the holes 301 to engage the V-grooves 118 on the cartridge 3. The balls 299 supplement the pressure plates 295 in holding the front of the cartridge tightly down against the ribs 277 and 288. They also provide a forward stop for the cartridge relative to the transducer assembly 205.

Rollers 305 are held between forwardly extending fingers 307 on the front of the pressure plates 289 of the transport 4. These rollers engage the outboard ends 27 of the cartridge doors 23 and swing the doors open as the cartridge is inserted in the transport.

Mounted on the upper face of the base plate are a pair of brackets 309 and 311 having forwardly extending arms 313 and 315, respectively. One arm 313 carries a spring loaded push rod 317, one end of which engages a switch 319 mounted on the bracket 311. The switch 319 is connected to the record head 211 and disables it unless the arm of switch 319 is closed by the push rod 317. The other end of the push rod 317 enters the hole 115 in the file protect sleeve 114 and senses the position of the file protect post 111. A front face 321 of the other of the bracket arms 315 engages a front face of one of the integral sleeves 114 in the cartridge 3 and acts as a stop for the cartridge 3.

At the front of the base plate 203 a door 323 is hinged to the base plate 203 as indicated at 325.

The door 323 also includes a part 327 extending below the base plate 203, which engages a safety switch 329 only when the door is closed. The safety switch 329 is connected into the control circuit 403 for the motors 235 and 237. The door 323 also includes a conventional latch 331.

The door 323 has side walls 333 and, on its inner face, a pair of lugs 335. When the door 323 is open, the lugs 335 are of the same height as the outboard ribs 277 on the base plate 203 and are aligned with the ribs 277. It has been found that the side walls 333 and the lugs 335 greatly facilitate aligning and inserting a cartridge 3 into the transport 4. When the door 323 is closed, the lugs 335 engage the back face 20 of the cartridge 3.

When a cartridge 3 is inserted to the transport 4, the sides 333 and lugs 335 on the door 323 engage the sides 17 and 19 and enter slots 126 and 127 on the lower face of the cartridge and guide the cartridge into the transport. As the cartridge enters the transport, rollers 305 engage the outer ends 27 of the cartridge doors 23 and swing the doors open to expose the front face of the cartridge. As the cartridge continues to move into the transport, the capstans 243 and 245 engage the peripheries of the tape rolls 65 and 67 and are pushed back into the transport against the bias of the spring 257. It will be noted that the cartridge 3 and transport 4 have been described as mating face-to-face; therefore, forward movement of the cartridge causes reverse movement of the capstans within the transport. After the capstans 243 and 245 have engaged the tape rolls 63 and 65, as the cartridge continues to move into the transport 4 the brake release rods 219 engage the faces 105 of the brake release wings 101 and 103 and spread the brake arms 91 and 93 to release the brake. As the brake bands 93 and 95 are loosened, the spring 89 at the back side of the cartridge relaxes completely and allows the hubs 51 and 53 to turn freely. The spring 89 is so chosen that it is not strong enough to overcome the frictional and inertial forces in the capstans 243 and 245 and motors 235 and 237. It therefore does not turn the hubs in a direction to loosen the tape span 69. When the cartridge has been moved into the transport, the door 323 is closed and automatically latches. If the cartridge 3 was not originally pushed completely forward, with the alignment balls 299 in the cartridge V-grooves 118 and the front face 321 of bracket arm 315 engaging the front face of the cartridge sleeve 114, the lugs 335 engage the back 20 of the cartridge and move the cartridge to its fully inserted position as the door 323 is closed.

When it is desired to remove a cartridge 3 from the transport 4, the door 323 is opened and the cartridge is grasped by finger hold 49 and pulled straight out from the transport. Opening the door 323 opens the safety switch 329, and opening of the safety switch 329 initiates a full deceleration command in the control circuit 403, as described hereinafter, to stop the tape before the cartridge can be removed. As the cartridge is removed, the brake arms 91 and 93 are pulled together by the heavy helical spring 107, and tighten the bands 85 and 87 on the hubs 51 and 53. Continued movement of the arms 91 and 93 forward each other stretches the first spring 89 and rotates the hubs to increase the tension in the tape span 89. As the cartridge clears the front of the transport, the cartridge dust doors 23 are snapped shut by their springs 47.

With the cartridge 3 in position and the door 323 closed, the tape hubs 51 and 53 are freely rotatable about axes which are precisely and firmly fixed in the transport, and the tape span 69 is precisely positioned across the transport tape guides 215, record head 211 and reproduce head 213. The capstans 243 and 245 are equally biased into engagement with the tape rolls 63 and 65 by the spring 257. With the file protect post 111 turned to the position illustrated, the file protect push rod 317 enters the opening 112 in the post through the hole 115 in the cartridge sleeve 114; the switch 319 is thus not closed and the record head 211 is electrically disabled. Closing the door 323 closes the switch 329 and activates the control circuit 403. The system is ready for operation.

D. Control Circuit and Operation

Figure 8:
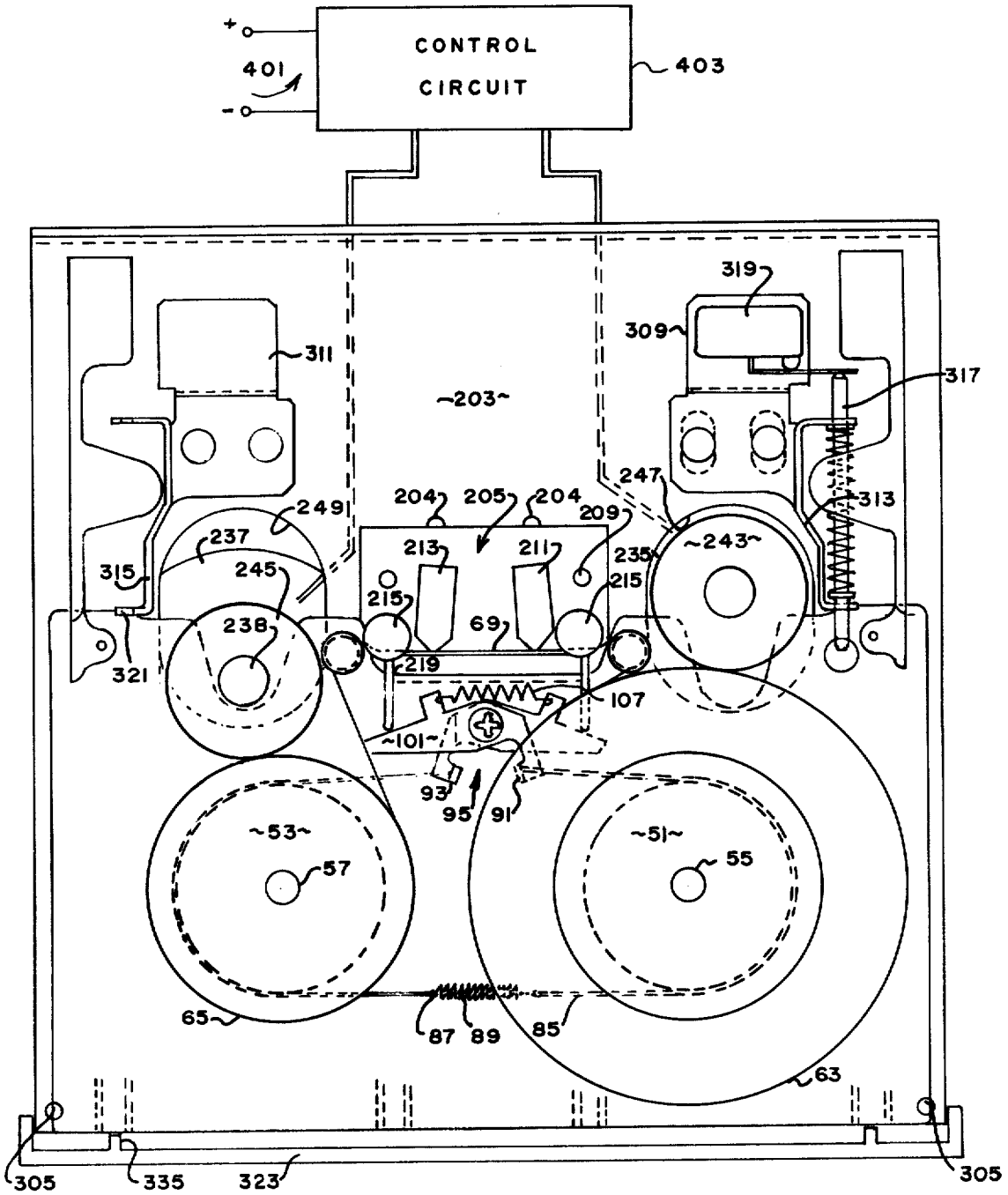
FIG. 8 is a somewhat schematic top plan view of the transport system of this invention, showing the interaction of the cartridge and transport.

The motors 235 and 237 are connected to a power source 401 through a control circuit 403. As illustrated, the second tape roll 65 is at its end-of-tape configuration. The activator 267 carried by the second carriage assembly 229 has thus activated its switch 275 and prevented the first motor 235 from reeling more tape onto the first roll 63. Therefore, the initial operation of the transport system 1 will be described with the capstans 243 and 245 turning counterclockwise as viewed in FIG. 8, the tape rolls 63 and 65 turning clockwise, and the tape 62 winding onto the second tape roll 65. The capstans 245 and motor 237 will thus be referred to initially as the "take-up capstan" and "take-up motor," and the capstan 243 and motor 235 as the "supply capstan" and "supply motor".

The primary functions of the control circuit 403 are first to accelerate the tape in a controlled manner to a selected speed, maintain the speed accurately, and decelerate the tape in a controlled manner to a stop, and second to maintain tape tension at a desired value throughout the operation of the transport system.

The design characteristics of the control circuit 403 are influenced by the nature of the transport system 1.

The peripheral drive system of the invention with its equal capstan biasing forces, assures that a given takeup capstan speed and supply capstan speed will always produce the same tape speed and tension without regard to the amount of tape in each tape roll. In the operation of the control circuit 403, at least the takeup motor is servo locked to a signal representing a desired tape speed and the supply motor provides tensioning. The amount of tensioning depends on the relative speeds of the capstans. The peripheral speeds of the capstans essentially equal the speeds of the tape at opposite ends of the span 69. For the one mil polyester tape of the preferred embodiment, a difference in capstan speeds of one percent produces a desirable tape tension of about 6.5 ounces. The difference in capstan speed may be generated in two ways: by applying a constant hold-back current to the supply motor, or by locking the supply motor to a reference signal which causes it to rotate at a slightly lower speed than the takeup motor. In either case, when the system is at speed the supply motor must apply a hold-back torque which represents the difference between the desired hold-back torque and the total mechanical resistance on the supply side of the transducer head. This mechanical resistance stems from friction generated in the hub bearings, in the capstan tape roll interface, in the supply motor bearings, and in the tape guides.

In the preferred system, the mechanical resistance is less than the total desired hold-back torque, and the supply motor is powered for rotation in a direction opposite its actual rotation, at least when the system is at speed.

The peripheral drive system of the invention handles tape very gently, yet permits high tape speeds and high acceleration and deceleration rates. Tape deformations such as cinching, spoking and cupping are virtually eliminated. Because the capstans 243 and 245 are biased with considerable force against the peripheries of the tape rolls 63 and 65, air is squeezed out of the take-up roll as it is formed, and the rolls are formed as hard, solid discs. Because the control system 403 maintains a constant difference in speed between the peripheral drive capstans 243 and 245, the tension of the tape 62 in the take-up roll, as well as in the span 69, is constant. The tape rolls 63 and 65 therefore act as if they were homogeneous polyester discs. The rolls 63 and 65 can not only withstand temperature variations and vibration without altering their configuration, but are also capable of high acceleration and deceleration rates without disturbing the configuration of the tape rolls.

The symmetry of the transport drive system, and of the tape rolls themselves, permits the system to be operated identically in either direction of the tape travel.

The precise control of tape speed and tension made possible by the system allows the control circuit to be designed for a greater speed range than previously possible, for example from a tape speed of 15/16 inch per second (23.8 mm/sec.) to a speed of 240 inches per second (6.1 meters/sec.).

Finally, because the transport system 1 relies on the differential speed of the capstans 243 and 245 to generate tape tension, the control circuit 403 must include provision for maintaining the speed differential under all conditions, including loss of power.

1. Dual Velocity Lock Control Circuit

Figure 9:
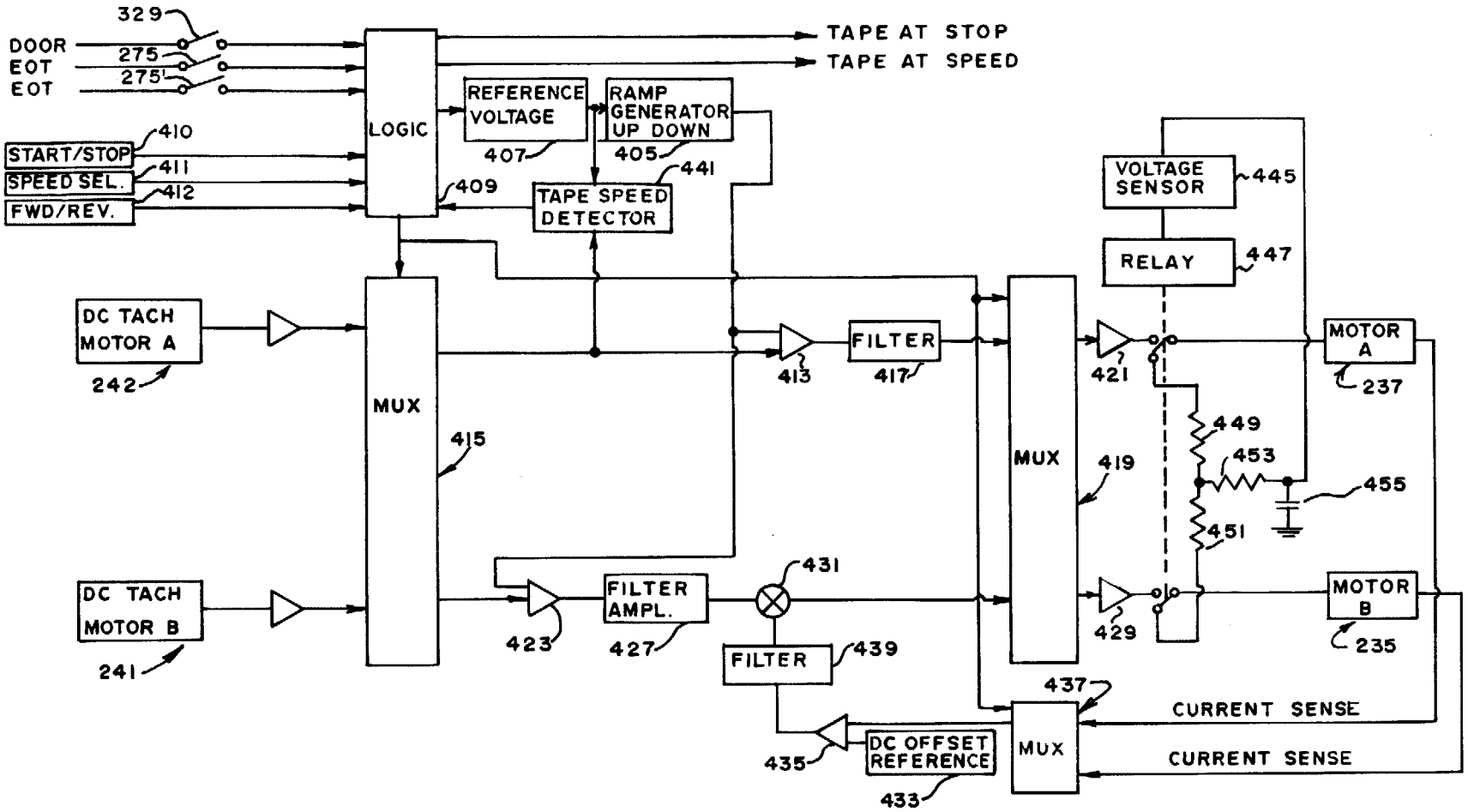
FIG. 9 is one embodiment of control circuit for the tape transport system of FIGS. 1-8.

In FIG. 9 the control circuit 403 is a dual DC tachometer servo system. The circuit is relatively simple, but like any analog system, it is subject to a certain amount of drift unless special precautions are taken. Therefore, it is well adapted to applications where slight speed variations are not objectionable, for example, digital data recorder systems.

Generally, a DC tachometer 242 on the takeup motor 237 produces a voltage which is proportional to motor speed. This voltage is compared with a reference voltage and the error signal is amplified to drive the takeup motor 237. The supply motor 235 is supplied a steady hold back current sufficient to maintain a desired tension at a selected speed. The hold back current, however, also includes an error signal derived by comparing the reference voltage with the output of a DC tachometer 241 on the supply motor 235. During acceleration, the supply reel error signal may exceed the constant current hold back bias, and the system may therefore act as a push-pull drive during acceleration.

More specifically, a reference signal representing a desired speed is generated in the control circuit 403 by a reference voltage generator 407. The reference generator 407 is controlled by a logic circuit 409 which has inputs from a start/stop switch 410, a speed select switch 411, a forward/reverse switch 412, the first end-of-tape switch 275, the second end-of-tape switch 275', and the transport door switch 329. The reference voltage from the reference generator 407 is fed to a ramp generator 405, which determines the rate of acceleration and deceleration of the transport system. The output of the ramp generator 405 is fed to one input of a differential amplifier 413. The output of the tachometer 242 of the takeup motor 237 is fed to the other input of differential amplifier 413 through a multiplexer 415. The differential amplifier 413 compares the output of the ramp generator 405 with the output of the DC tachometer 242 and produces an error signal proportional to the difference in signal strength. The error signal is fed through a first filter 417, a second multiplexer 419 and power amplifier 421 to the takeup motor 237. The filter 417 is a low band-pass filter, which is compensated to stabilize the servo system. The takeup motor channel of the servo system, just described, has high gain; therefore, the takeup motor 237 is "hard" locked onto the reference voltage.

The reference signal from ramp generator 405 is also fed to one input of a second differential amplifier 423. The output of DC tachometer 241 on the supply motor 235 is fed to the other input of differential amplifier 423, through the multiplexer 415. The differential amplifier 423 produces an error signal which is filtered by a filter 427. The filter 427 has low gain at frequencies below one hertz and high gain above ten hertz.

A DC offset reference voltage is generated by a reference voltage generator 433 and is fed to one of the inputs of a third differential amplifier 435. The current to the supply motor 235 is sensed by a multiplexed current sensor 437, and produces a holdback current signal which is fed to the other input of differential amplifier 435. The error signal generated by differential amplifier 435 is filtered by a filter 439. The filter 439 has high gain at frequencies below 1 hertz, but very low gain above 10 hertz.

The error signals from filter 427 and filter 439 are summed by a summing network 431 and fed through the multiplexer 419 to a second power amplifier 429 which drives the supply motor 235. It will be seen that the gain of filter 427 and the gain of filter 439 are so chosen that the supply motor runs at a constant average current and therefore provides a constant average holdback torque at the periphery of the supply roll of tape. Although the supply motor channel of the servo system, just described, locks the supply motor 235 much more "softly" than the takeup motor 237 to the reference voltage of reference generator 407, the gain characteristics of filters 427 and 439 provide good dynamic speed correction. A five percent drift of tachometer voltage with respect to speed produces only about one ounce of difference in tape tension. Therefore, relatively inexpensive tachometers may be used without creating objectionable performance characteristics for a digital data recorder system.

The multiplexers 415, 419 and 437 act as ganged electronic double throw switches, controlled by a forward-/reverse switch 412 through logic circuit 409. The first multiplexer 415 connects the DC tachometers 242 and 241 to the first and second differential amplifiers 413 and 423, respectively, as previously described when the switch 412 is in its "forward" position. When the switch 412 is thrown to its "reverse" position, the multiplexer 415 reverses the connections, so that the tachometer 242 is connected to the second differential amplifier 423 and the tachometer 241 is connected to the first differential amplifier 413. Simultaneously, the second multiplexer 419 connects the output side of the first filter 417 with the power amplifier 429 of the original supply motor 235 and connects the output side of adder 431 to the power amplifier 421 of the original takeup motor 237. Likewise, the multiplexed current sensor 437 is connected to sense the original takeup motor 237 current amplitude. Therefore, the effect of throwing the reversing switch 412 is to connect the original takeup motor 237 (and its associated power amplifier 421) and tachometer 242 to the supply motor servo channel of the control circuit 403, and to connect the original supply motor 235 to the takeup motor servo channel of the control circuit. Because of the opposite wiring of the motors 235 and 237, the same signals applied to the opposite motors cause the motors to reverse the direction of tape movement. It will thus be seen that operation of the transport system in a reverse mode is precisely the same as described hereinafter for the forward mode, with the motors exchanging roles.

When a start command is given through the switch 410, the logic circuit 409 requires that certain conditions be met before it activates ramp generator 405. The transport door switch 329 must be closed. If either the first end-of-tape switch 275 or the second end-of-tape switch 275' is closed, the state of the forward/reverse switch 412 determines whether a start signal is generated; the system is thereby prevented from attempting to transfer more tape from a nominally empty hub. The logic circuit 409 also requires a "tape stopped" indication from a threshold sensor 441, which produces a signal indicative of tape movement whenever the output of the actual takeup motor tachometer exceeds an arbitrary value indicative of a tape speed of, say, one-quarter inch per second.

If all of the required conditions are met, the logic circuit 409 actuates the reference voltage generator 407 and the ramp generator 405. When the ramp voltage generated by the ramp generator 405 reaches the value set by the reference voltage generator 407, the voltage remains at that value as a fixed speed reference. The speed control 411 may, for example, have settable speeds of 15/16 inch per second, $1\frac{7}{8}$ ips, 30 ips, 60 ips an 240 ips, and the reference voltage generator 407 provides corresponding voltage levels.

As the ramp voltage increases, the takeup motor 237 lags the speed set signal slightly, and its tachometer 242 therefore produces a signal which is translated by the takeup motor servo channel of the control circuitry to a large positive speed error signal. The speed error signal in turn is amplified and used to drive the motor 237. A similar speed error signal is produced at the filter amplifier 427 in the supply motor servo channel. This speed error signal is added to the holdback current error signal from filter amplifier 439. During full acceleration, the speed error signal from filter amplifier 427 exceeds the holdback error signal from filter amplifier 439, and a net signal is applied to the supply motor 235 which tends to accelerate the supply motor 235 in the same direction of rotation as the takeup motor 237. It will be seen that the differential amplifier 423 and filter amplifier 427 may produce a signal which is identical with the error signal driving takeup motor 425 (but inverted).

The ramp generator 405 is pre-set to ensure smooth and rapid start-up and optimum acceleration of the takeup motor within its capabilities. The slope of the ramp voltage generated by the ramp generator 405 is chosen with due regard to motor size, so that each motor tracks the ramp very closely, regardless of the amount of tape on the roll which it is driving. Therefore, tape slack and excessive tape tension are impossible.

The threshold detector 441 also compares the reference voltage with the speed signal voltage produced by the actual takeup motor tachometer and gives an indication when the speed signal reaches its normal operating range. This at-speed indication is particularly important when the system is in a second mode, for indicating when data may safely be transferred to the tape.

As previously described, when the tape is at speed, the holdback current applied to supply motor 235 is sufficient to make it run about 1.5% slower than the takeup motor 237, and thus puts the tape under about 6.5 ounces of tension. The control circuit 403 is capable of extremely rapid correction of speed variations in both the takeup motor and the supply motor. Therefore, flutter is reduced to very low values and tape speed and tension are controlled very precisely.

A tape deceleration command may be initiated in a number of manners, for example by the manual start/-stop switch 410, by activation of an end of the tape switch 275, or by opening the transport door. Whenever a deceleration command is given, the logic circuit 409 initiates a down ramp in the ramp generator 405 from the operating speed signal voltage to a zero speed voltage setting. The down ramp slope is pre-set to ensure optimum deceleration time within the capabilities of the motors 235 and 237. The minimum voltage at the bottom of the ramp may be the same as the starting voltage of the acceleration command, and prevents the offset voltage from causing the supply motor to reverse its direction of rotation.

As the ramp voltage decreases, it drops below the output of the tachometers 241 and 242 and causes a braking current to be applied to the takeup motor 237 and a correspondingly increased braking current to be applied to the supply motor 235. The motors both closely track the down ramp voltage, with the offset in the supply motor signal providing tape tension. When the output of the takeup motor tachometer 242 reaches its predetermined low value, the threshold detector 441 causes the logic circuit 409 to disconnect power to the motors 235 and 237 and the capstans quickly come to a stop.

So long as electric power is supplied from the power source 401, the parts of the control circuit 403 previously described ensure that the tape 62 is maintained under substantially constant tension both in the span 69 and on the rolls 63 and 65. Should the power fail for any reason, sufficient energy must be stored in the system to stop the motors 235 and 237 without tape spillage. The present system obviates the need for large capacitors or the like to supply this energy, by the use of a switching circuit which causes the motors 235 and 237 to act as opposing generators and brings them to a rapid stop. The voltage across the power supply 401 is sensed by a voltage sensor 445. The voltage sensor 445 controls a relay 447. When the voltage sensed by the voltage sensor 445 drops below a preset value, the voltage sensor causes relays 447 to disconnect the motors 235 and 237 from the amplifiers 421 and 429 (and from the rest of the control circuit 403) and causes it to connect them to each other through a resistor network consisting of series-connected resistors 449, 451 and 453. As the motors continue to turn, their back e.m.f. is applied to each other through the resistors 449 and 451. The resistor 453 equalizes any differences in the back e.m.f. of the motors. A filter capacitor 455 provides the additional power needed to make up the motor losses and bring the motors to a complete stop. The size of the capacitor 455 is far less than would be necessary to prevent tape spillage if the back e.m.f. of the motors were not utilized.

2. Dual Phase Lock Control Circuit

Figure 10:
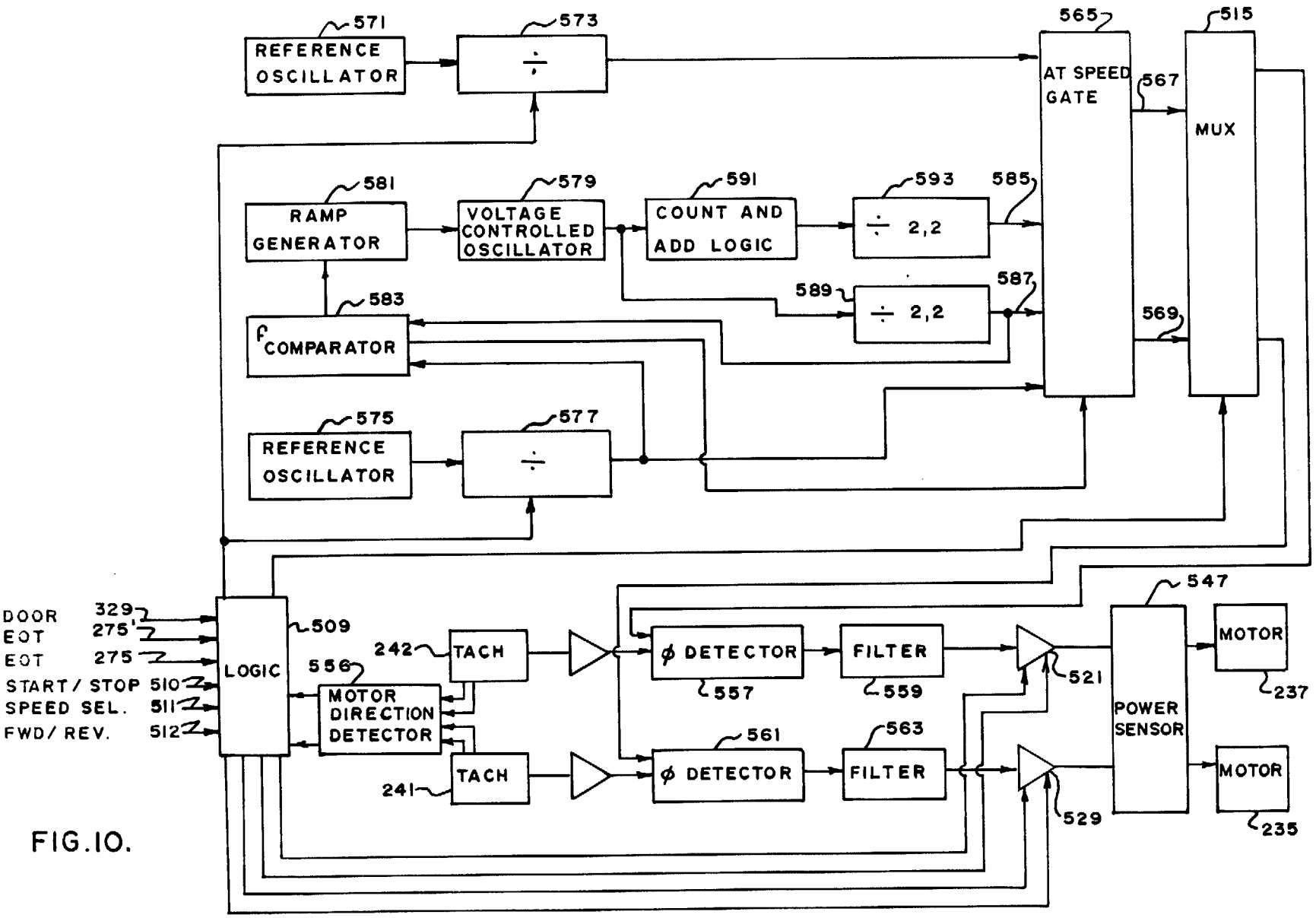
FIG. 10 is another embodiment of control circuit for the tape transport system of FIGS. 1-8.

Another embodiment of control circuit 403, which is less subject to speed drift and long-term changes in tape tension, but which requires tighter tolerances in the size and roundness of the capstans 243 and 245, is shown in FIG. 10. This control circuit is a dual digital tachometer servo system in which the pulsed output of the takeup motor tachometer is phase locked to a first reference frequency, and the pulsed output of the supply motor tachometer is phase locked to a second, lower, reference frequency. The speeds of the drive motors can be controlled with utmost accuracy, because the phase lock system operates on errors in the rotational positions of the drive motors, rather than on errors in their velocities. The use of highly accurate and stable crystal oscillators and the use of high resolution digital tachometers permit the instantaneous angular position of each capstan to be controlled within a small fraction of a degree.

Generally, a high resolution digital tachometer 242 on the takeup motor 237 produces a train of 8,000 pulses per revolution. The train of pulses is phase locked to a reference oscillator by means of a phase detector, in accordance with known servo system practice. An identical digital tachometer 241 on the supply motor 235 produces a speed signal which is similarly phase locked to a second, lower frequency, clocking signal. The difference in clocking frequencies is chosen to provide the desired tape tension. During acceleration and deceleration, the clocking signals are derived from a single voltage-controlled oscillator driven from a ramp voltage. Additional pulses are added to the clocking signal for the takeup motor. This system ensures that the speed difference between the takeup and supply motors is maintained during acceleration and deceleration; it also allows push-pull drive during acceleration and deceleration.

As shown in FIG. 10, the basic organization of the dual phase lock control circuit is similar to the organization of the dual DC (velocity lock) system of FIG. 9. A logic circuit 509 has selectable inputs from a stop/start switch 510, a speed select switch 511 and a forward-/reverse switch 512. It also has inputs from the "end of tape" switches 275 and 275' and the transport door switch 329. The logic circuit 509 controls speed by setting a speed control signal, controls acceleration and deceleration by initiating an up or down ramp controlling the speed control signal, and controls the direction of tape movement by controlling the polarity of the power amplifiers for the motors and by controlling a multiplexer 515 which alternatively connects a takeup motor reference signal into a servo channel for the motor 237 and a supply motor reference signal into a servo channel for the motor 235 when the forward-/reverse switch 512 is in a "forward" position, and connects the reference signals into the opposite servo channels when the switch 512 is in a "reverse" position. As will become apparent, the control circuit of this embodiment also provides precisely symmetrical operation in its forward and reverse modes. Although not shown in detail, the loss-of-power relay 447 and associated circuitry of the previous embodiment are incorporated in the control circuit of FIG. 10, as indicated at 547.

The logic circuit 509 also has an input from a motor direction detector 556. In this embodiment, each tachometer includes two tachometer discs, each with its own optical scanning device. The discs are mounted with one disc leading the other by 90°. Therefore, the phase displacement of the signals from the two tachometers of each motor provides an immediate indication of the direction of rotation of the motor. The motor direction detector 556 also senses when the interval between pulses exceeds a predetermined minimum (e.g. 2.5 milliseconds), and gives a "tape stopped" indication to the logic circuit 509.

The output from the original takeup motor tachometer 242 is fed to one input of a first phase detector 557. The other input of the phase detector 557 is connected to a first output 567 of a reference signal generator, through the multiplexer 515. The phase detector 557 produces an error signal representative of the phase difference between each pulse of the reference signal and a corresponding pulse of the speed signal from the tachometer 242. The magnitude of the error signal as the pulses approach being 90° out of phase keeps the motor "hard" locked to the reference signal. The error signals from the phase detector 557 are filtered by a filter 559 and amplified by controlled power amplifier 521 to provide smooth motor control for the original takeup motor 237.

The output of the supply motor tachometer 241 is fed to one input of a second phase detector 561. The other input of the phase detector 561 is connected through the multiplexer 515 to the second output 569 of the reference signal generator. The phase detector 561 produces an error signal representing phase differences between its reference signal and its motor speed signal, and this error signal is filtered and smoothed by a second filter 563 which may be identical with the first filter 559. The filtered and smoothed error signal is fed to the original supply motor 235 through controlled power amplifier 529.

As described in more detail hereinafter, when the motors 237 and 235 are rotating at their selected speeds, an at-speed gate 565 connects the first (takeup motor) reference signal output 567 with a first crystal oscillator 571 and a first controllable frequency divider 573, and connects the second (supply motor) reference output 569 with a second crystal oscillator 575 and a second controllable frequency divider 577. The first crystal oscillator 571 oscillates at a frequency of about 410 kHz, and the second oscillator 575 at a frequency of about 404 kHz. The frequency of the crystals 571 and 575 represents the highest set speed of the system, 240 inches per second (6.1 meters per sec.). The frequency dividers 573 and 577 are set by the logic circuit 509 in response to the speed select control 511, to reduce the frequency of the reference by a suitable factor to provide a desired tape speed. For example, a tape speed of 30 inches per second requires the crystal frequencies to be divided by eight, i.e. requires dividers 573 and 575 to produce one output pulse for every eight input pulses. The frequency dividers 573 and 575 are conveniently binary dividers and provide nine set speeds: 240 ips, 120 ips, 60 ips . . . 15/16 ips.

During acceleration and deceleration of the motors 237 and 235, the reference signals are both derived, as shown at 585 and 587, from a single voltage-controlled oscillator 579. The voltage-controlled oscillator is driven by a ramp generator 581 controlled by a frequency comparator 583. The voltage-controlled oscillator 579 output is fed through a two-stage frequency divider 589, the output of which is indicated at 587. The voltage-controlled oscillator 579 output is also fed to a count-and-add circuit 591, which counts sixty-four pulses as they pass through and then adds a pulse. The resultant train of pulses has an average frequency 1.56% greater than the output of the voltage-controlled oscillator 579. The output of the count-and-add circuit 591 is fed to two-stage divider circuit 593 to smooth out the frequency of the pulse train. The output of the divider 593 is indicated at 585. The signals produced at 585 and 587 may be designated first and second ramped reference signals, respectively.

The frequency comparator 583 compares the frequency of the second ramped reference signal, as indicated at 587, with the frequency representing the desired set speed, as produced at the output of the second frequency divider 577. If the frequencies are different, the frequency comparator 583 causes the ramp generator to generate an up or down ramp (depending on which frequency is greater) and simultaneously causes the at-speed gate 565 to connect the first and second reference signal outputs 567 and 569 to first and second ramped reference outputs 585 and 587 respectively. If the desired frequency and the second ramped reference frequency match, the ramp generator keeps the ramp at the same level and switches the at-speed gate 565 to connect the reference crystals 571 and 575 to the reference outputs 567 and 569, respectively, as previously described. The crystals provide a more stable and interference-resistant reference than do the ramped reference frequencies.

When a start command is given through the switch 510, the logic circuit 509 requires that the same conditions be met as in the previously described dual velocity lock circuit. If all the required conditions are met, the logic circuit 509 sets the polarities of the power amplifiers 521 and 529, and activates the frequency divider circuits 573 and 577. At stop, the frequency dividers are set to provide no output. If the speed select switch is set at 30 ips, the frequency dividers are set to divide the crystal frequencies by eight. The frequency comparator 583 responds to the difference between the 50.5 kHz output of frequency divider 577 and the zero frequency of the second ramped reference signal, by (1) causing at-speed gate 565 to connect the first reference output 567 to first ramped reference signal 585 and the second reference output 569 to second ramped reference signal 587, and (2) activating ramp generator 581 to produce an up ramp having a slope chosen to cause the voltage controlled oscillator to increase its frequency 5 kHz per millisecond. For every four pulses received by the first two-stage divider 589, it produces one pulse of the second ramped reference signal. For every 64 pulses received by the count-and-add circuit 591, it produces 65 pulses. The output of the circuit 591 is also divided by four in divider 593 to give the first ramped reference signal. In about forty milliseconds the voltage controlled oscillator has reached an instantaneous frequency of 202 kHz, and the second ramped reference signal has reached an instantaneous frequency of 50.5 kHz. At this point, the frequency comparator 583 stops the ramp generator (thereby maintaining its voltage output constant and locking the voltage controlled oscillator to a frequency four times that of the second reference crystal 575) and switches the reference outputs 567 and 569 to the outputs of frequency dividers 573 and 577, respectively.

The ramped reference signals at 567 and 569 are applied to phase detectors 557 and 561. Because the motor tachometers 242 and 241 are not turning, a very large error signal is produced in each motor drive circuit and the motors 237 and 235 both begin to rotate in the same direction. When the motors have turned one eight-thousandth of a revolution or less, they produce their first output pulse, and become phase-locked to the reference signals. When the motors have turned less than one thousandth of a revolution, the motor direction detector 556 senses their direction of rotation and shuts off power to one or both motors if they are rotating in the wrong direction. The ninth pulse from the takeup motor reference 567 comes ahead of the ninth pulse from the supply motor reference 569 and thereafter the instantaneous frequency of the takeup motor reference is greater than the instantaneous frequency of the supply reference. Because the frequencies of the reference signals are increasing rapidly, the slight unevenness in the rate of increase of the takeup reference signal frequency does not cause any substantial unevenness in the acceleration or running of the takeup motor. It will be seen that differential capstan speed is attained, and tensioning is thus provided in the tape span, before the tape has moved any substantial distance. Because every eight-thousandth of a revolution of capstan movement is locked to a reference frequency and the reference frequencies are maintained 1.5% apart, both motors can be driven throughout the acceleration operation, in a push-pull drive. Should either motor begin to accelerate too quickly, the power to that motor is adjusted within a single cycle of the reference frequency. As in the dual velocity lock system, the slope of the voltage ramp is carefully selected to permit tight control of the motor speed under all conditions.

When the tape is at speed, any variation in capstan speed is immediately corrected by the phase lock servo, and extremely accurate control of tape speeds and tape tension are made possible over the full speed range of the system.

When a tape stop command is given to the logic circuit 509, the logic circuit immediately sets the frequency dividers 573 and 577 to zero output. The frequency comparator 583 immediately senses a difference between the zero frequency of the frequency divider 577 output and the frequency of the second ramped reference signal and simultaneously (1) causes the at-speed gate 565 to connect the first reference output 567 to first ramped reference signal 585 and the second reference output 569 to second ramped reference signal 587, and (2) causes ramp generator 581 to produce a down ramp having a slope chosen to cause the voltage controlled oscillator to decrease its frequency at the rate of 5 kHz per millisecond. Therefore, the frequencies of the output signals at the reference outputs 567 and 569 are reduced to zero in 40 milliseconds. During deceleration, the positions of the motor tachometers constantly lead the set position, and negative error signals are produced by the phase comparators. The error signals are translated by the amplifiers into strong braking currents applied to the motors. Because the takeup motor reference signal is maintained at 1.5% higher frequency than the supply motor reference during deceleration, constant tape tension is maintained during deceleration. When the motor direction detector 556 senses that the tape speed is below one-quarter inch per second, the logic circuit disconnects the power amplifiers 521 and 529, to prevent slight movements of the capstans arising from noise in the control circuit.

If a tape reversal command is given to the logic circuit 509 while the tape is moving, the logic circuit 509 senses a difference between the commanded tape direction and the direction of movement of both motors as sensed by the detector 556. The difference between commanded and sensed directions causes the logic circuit to generate a stop command until a tape stopped signal is received from the detector 556, then causes the multiplexer 515 to reverse the connections of reference signal outputs 567 and 569 and reverses the polarities of power amplifiers 521 and 529 to reverse the direction of tape movement, then initiates an acceleration command.

Numerous variations in the tape recorder system of this invention, within the scope of the appended claims, will occur to those skilled in the art in light of the foregoing disclosure. Merely by way of example, although the dual motor, differential servo system, drive system for the capstans provides extremely accurate and easily adaptable control for a wide range of applications, some of the advantages of the present invention may be retained if other systems for generating differential capstan speeds are employed. Such systems could include, for example, a uni-directional system in which a mechanical or electro-mechanical braking force is applied to one of the capstans to provide a constant drag force on the tape span, and single drive motor drives the takeup roll capstan. Inverting the cartridge would then be required for rewinding or multiple track recording. Other mechanical systems for driving the capstans at different speeds are also possible. Although the use of cartridges is one of the major advantages of the present invention, as previously indicated the system provides advantages in a transport having permanently installed tape roll hubs. In the cartridge, the tape may be wrapped in the opposite direction on the hubs, to provide a larger wrap angle around the cartridge tape guides, although the preferred tape path permits a more compact transport design, provides a long, well-supported tape span, and causes the drive capstans to engage the non-oxide side of the tape. The cartridge brakes and doors, the end-of-tape indicators, the file protect devices, the cartridge alignment means, and other details of the system may be changed. These variations are merely illustrative.

I claim:

1. A tape transport system comprising a pair of coplanar hubs rotatable about fixed axes and a length of pliable tape carried in rolls on said hubs; a transducer cooperative with a span of tape intermediate said rolls; and drive means for driving said tape across said transducer from one said tape roll to the other said tape roll, for maintaining substantially constant tension in said entire length of tape in all modes of operation of said system and for producing hard-packed, highly reproducible and stable tape rolls, said drive means comprising a first capstan movable into engagement with the periphery of the first of said tape rolls, a second capstan movable into engagement with the periphery of the second of said tape rolls, a first variable speed motor drivingly connected to said first capstan and a second variable speed motor drivingly connected to said second capstan, a first carriage, said first motor being mounted on said first carriage and said first capstan being mounted on a rotor of said first motor, and a second carriage, said second motor being mounted on said second carriage and said second capstan being mounted on a rotor of said second motor, biasing means for biasing said capstans into driving engagement with the peripheries of said tape rolls, said biasing means including spring means through which said carriages are connected to each other, whereby said biasing means equalize the forces exerted by the capstans on the tape rolls regardless of the relative sizes of the tape rolls, and control circuit means connected to both said motors for controlling the speed of each of said motors, thereby generating a desired speed and tension in said span of tape intermediate said rolls, said capstans being the sole motive force for driving said tape across said transducer from one said tape roll to the other said tape roll.

2. The system of claim 1 wherein said control circuit means comprise means for driving said first motor in a first direction to wind tape onto said first tape roll at a preselected speed, and means for energizing said second motor for rotation in a direction opposite the direction of its actual rotation to tension said span of tape with a preselected tension.

3. The system of claim 1 wherein said carriages are mounted on slides for movement in a direction generally perpendicular to a line through the axes of said tape rolls.

4. The system of claim 1 wherein said control circuit means comprise means for generating a reference signal representative of a desired tape speed, means for driving said first motor at a first speed with respect to said reference signal and means for causing said second motor to rotate at a lower second speed to tension said span of tape.

5. A tape transport system comprising a pair of coplanar hubs rotatable about fixed axes and a length of pliable tape carried in rolls on said hubs; a transducer cooperative with a span of tape intermediate said rolls; and drive means for driving said tape across said transducer from one said tape roll to the other said tape roll, for maintaining substantially constant tension in said entire length of tape in all modes of operation of said system and for producing hard-packed, highly reproducible and stable tape rolls, said drive means comprising a first capstan movable into engagement with the periphery of a first of said tape rolls, a second capstan movable into engagement with the periphery of the second of said tape rolls, a first variable speed motor drivingly connected to said first capstan and a second variable speed motor drivingly connected to said second capstan, biasing means for biasing said capstans into driving engagement with the peripheries of said tape rolls, a pair of rotatable tape guide means spaced from both said tape rolls for engaging a back face of said tape to define at least a part of said span, and wherein said rolls are so wound that said back face of said tape faces out on said rolls, wherein said transducer engages a front face of said tape between said tape guides, and wherein said capstans engage said rolls at points spaced at least 180° in the direction of tape wrap from the points at which tape leaves or first contacts the tape rolls, and control circuit means connected to both said motors for controlling the speed of each of said motors, thereby generating a desired speed and tension in said span of tape intermediate said rolls, said capstans being the sole motive force for driving said tape across said transducer from one said tape roll to the other said tape roll.

6. The system of claim 5 wherein said control circuit means comprise means for driving said first motor in a first direction to wind tape onto said first tape roll at a preselected speed, and means for energizing said second motor for rotation in a direction opposite the direction of its actual rotation to tension said span of tape with a preselected tension.

7. The system of claim 5 wherein said drive means comprise a first carriage, said first motor being mounted on said first carriage and said first capstan being mounted on a rotor of said first motor, and a second carriage, said second motor being mounted on said second carriage and said second capstan being mounted on a rotor of said second motor.

8. The system of claim 7 wherein said biasing means including spring means through which said carriages are connected to each other, whereby said biasing means equalize the forces exerted by the capstans on the tape rolls regardless of the relative sizes of the tape rolls.

9. The system of claim 7 wherein said carriages are mounted on slides for movement in a direction generally perpendicular to a line through the axes of said tape rolls.

10. A cartridge-type tape transport system comprising:

(A) a cartridge enclosing a pair of coplanar hubs rotatable about fixed axes, a length of pliable tape carried in rolls on said hubs with a span of tape intermediate said rolls, and tape guide means engaging said span, said tape guide means being spaced from said tape rolls, and (B) a transport comprising:

(1) means for positioning said cartridge in said transport, (2) a transducer cooperative with said span of tape when said cartridge is positioned in said transport; and (3) drive means for driving said tape across said transducer onto a first said tape roll from the second said tape roll when said cartridge is positioned in said transport, for maintaining substantially constant tension in said entire length of tape in all modes of operation of said system and for producing hard-packed, highly reproducible and stable tape rolls, said drive means comprising a first capstan movable into engagement with the periphery of a first of said tape rolls, a second capstan movable into engagement with the periphery of the second of said tape rolls, a first variable speed motor drivingly connected to said first capstan and a second variable speed motor drivingly connected to said second capstan, a first carriage, said first motor being mounted on said first carriage and said first capstan being mounted on a rotor of said first motor; and a second carriage, said second motor being mounted on said second carriage and said second capstan being mounted on a rotor of said second motor, biasing means for biasing said capstans into driving engagement with the peripheries of said tape rolls, said biasing means including spring means through which said carriages are connected to each other, whereby said biasing means equalize the forces exerted by the capstans on the tape rolls regardless of the relative sizes of the tape rolls, and control circuit means connected to both said motors for controlling the speed of each of said motors, thereby generating a desired speed and tension in said span of tape intermediate said rolls, said capstans being the sole motive force for driving said tape across said transducer from one said tape roll to the other said tape roll.

11. The system of claim 10 wherein said control circuit means comprise means for driving said first motor in a first direction to wind tape onto said first tape roll at a preselected speed, and means for energizing said second motor for rotation in a direction opposite the direction of its actual rotation to tension said span of tape with a preselected tension.

12. The system of claim 10 wherein said carriages are mounted on slides for movement in a direction generally perpendicular to a line through the axes of said tape rolls.

13. The system of claim 10 wherein said control circuit means comprise means for generating a reference signal representative of a desired tape speed, means for driving said first motor at a first speed with respect to said reference signal and means for causing said second motor to rotate at a lower second speed to tension said span of tape.

14. The system of claim 13 wherein said capstans are of equal circumference and are mounted on rotors of said motors, and wherein said control means further comprise reversing means for winding said tape on the other said tape roll, said reversing means comprising means for driving said second motor in an opposite direction of rotation at said first speed with respect to said reference signal and means for causing said first motor to rotate in an opposite direction of rotation at said second, lower speed.

15. The system of claim 10 wherein the axes of rotation of both said capstans are in all operative positions on a one side of a line through the axes of said tape rolls, wherein said span of tape is also on the one side of said through the axes of said tape rolls, and wherein said transducer is entirely on the one side of said span, such that said cartridge may be inserted in said transport with said capstans engaging said tape rolls and said transducer engaging said span entirely by movement of said cartridge forward into said transport.

16. The system of claim 15 wherein said cartridge includes a pair of tape guides engaging said tape and defining said span and wherein said transport includes a pair of tape guides flanking said transducer and engaging said span when said cartridge is in said transport, said transport tape guides being positioned on the one side of said span and said cartridge tape guides being positioned on a rearward side of said span.

17. The system of claim 16 wherein said cartridge tape guides and said transport tape guides include upper and lower tape edge engaging portions and wherein said cartridge tape guides have a height between tape edge engaging portions which is greater than the height between tape edge engaging portions of said transport tape guides.

18. The system of claim 15 wherein said cartridge includes a pair of tape guides engaging a rearward side of said span and wherein said rolls are wound in such a direction that said capstans engage the same face of said tape as do said tape guides.

*19. A tape transport comprising a pair of coplanar hubs rotatable about fixed axes and a length of pliable tape carried in rolls on said hubs; a transducer cooperative with a span of tape intermediate said rolls; and drive means for driving said tape across said transducer from one said tape roll to the other said tape roll, for maintaining substantially constant tension in said entire length of tape in all modes of operation of said system and for producing hard-packed, highly reproducible and stable tape rolls, said drive means comprising a first capstan movable into engagement with the periphery of the first of said tape rolls, a second capstan movable into engagement with the periphery of the second of said tape rolls, means including a variable speed motor drivingly connected to said first capstan and to said second capstan, a first carriage, said first capstan being mounted on said first carriage, and a second carriage and said second capstan being mounted on said second carriage, biasing means for biasing said capstans into driving engagement with the peripheries of said tape rolls, said biasing means including spring means through which said carriages are connected to each other, whereby said biasing means equalize the forces exerted by the capstans on the tape rolls regardless of the relative sizes of tape rolls, and control circuit means connected to said motor for controlling the speed of said motor, thereby generating a desired speed and tension in said span of tape intermediate said rolls, said capstans being the sole motive force for driving said tape across said transducer from one said tape roll to the other said tape roll.*

* * * * *